United States Patent
Kobayashi et al.

(10) Patent No.: US 12,122,316 B2
(45) Date of Patent: Oct. 22, 2024

(54) SIDE AIRBAG DEVICE

(71) Applicant: Autoliv Development AB, Vargarda (SE)

(72) Inventors: Yuto Kobayashi, Kanagawa (JP); Takaki Shibuya, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 18/248,493

(22) PCT Filed: Oct. 10, 2021

(86) PCT No.: PCT/JP2021/037491
§ 371 (c)(1),
(2) Date: Apr. 10, 2023

(87) PCT Pub. No.: WO2022/080286
PCT Pub. Date: Apr. 21, 2022

(65) Prior Publication Data
US 2023/0406254 A1    Dec. 21, 2023

(30) Foreign Application Priority Data
Oct. 13, 2020  (JP) .................................. 2020-172364

(51) Int. Cl.
*B60R 21/207* (2006.01)
*B60R 21/201* (2011.01)
*B60R 21/237* (2006.01)

(52) U.S. Cl.
CPC .......... *B60R 21/207* (2013.01); *B60R 21/201* (2013.01); *B60R 21/237* (2013.01)

(58) Field of Classification Search
CPC .............................. B60R 21/207; B60R 21/237
See application file for complete search history.

(56) References Cited

U.S. PATENT DOCUMENTS 9,751,487 B2 *  9/2017  Sendelbach ....... B60R 21/23138
11,104,287 B2 *  8/2021  Kobayashi ............ B60R 21/207
(Continued)

FOREIGN PATENT DOCUMENTS

JP         4-306149 A      10/1992
JP       2005014862 A       1/2005
(Continued)

OTHER PUBLICATIONS

Japanese Office Action regarding Patent Application No. 2022556948, dated Aug. 17, 2023.

*Primary Examiner* — Faye M Fleming
(74) *Attorney, Agent, or Firm* — Harness, Dickey & Pierce, P.L.C.; Stephen T. Olson

(57) ABSTRACT

A side airbag device having an airbag cushion that restrains an occupant by expanding and deploying and an inflator disposed on an inner side of the seat frame that supplies expansion gas to the airbag cushion; and a holding part that holds the airbag cushion. The airbag cushion includes an inner expanding portion internally containing the inflator and an outer expanding portion connected to the inner expanding portion and is disposed on an outer side of the seat frame by being folded back at a front edge portion of the seat frame. The outer expanding portion includes a folded portion of the airbag cushion. A forward portion of the holding part contacts an outer surface of the folded portion of the outer expanding portion, and a rearward portion is connected to the seat frame. Furthermore, the holding part is configured to cover a part of the outer expanding portion.

11 Claims, 17 Drawing Sheets

(56) References Cited

U.S. PATENT DOCUMENTS

| | | | | |
|---|---|---|---|---|
| 11,654,852 B2* | 5/2023 | Baldreus | ............... | B60R 21/231 |
| | | | | 280/302 |
| 11,752,965 B2* | 9/2023 | Kobayashi | ............... | B60N 2/58 |
| | | | | 280/728.1 |
| 11,752,966 B2* | 9/2023 | Kobayashi | ............ | B60R 21/233 |
| | | | | 280/729 |
| 11,766,983 B2* | 9/2023 | Kobayashi | ........ | B60R 21/23138 |
| | | | | 280/728.2 |
| 11,865,988 B2* | 1/2024 | Kobayashi | ............ | B60R 21/207 |
| 2023/0202421 A1* | 6/2023 | Kobayashi | ............ | B60R 21/237 |
| | | | | 280/730.2 |

FOREIGN PATENT DOCUMENTS

| | | |
|---|---|---|
| JP | 2011068159 A | 4/2011 |
| JP | 2019-137100 A | 8/2019 |
| WO | 2013/034742 A1 | 3/2013 |
| WO | 2014061452 A1 | 4/2014 |
| WO | 2018/105335 A1 | 6/2018 |

* cited by examiner

A1-A1 CROSS SECTION

Embodiment 2

Embodiment 3

Embodiment 4

Embodiment 6

A1-A1 CROSS SECTION

SIDE AIRBAG DEVICE

TECHNICAL FIELD

The present invention relates to a side airbag device equipped in a vehicle seat.

BACKGROUND ART

In order to protect occupants in the event of a vehicle collision, it is well known that vehicles are equipped with one or a plurality of airbags. These airbags include, for example, various forms such as: a so-called driver airbag which expands from near the center of the steering wheel of an automobile so as to protect a driver; a curtain airbag which deploys downward along an inner side of a window of an automobile so as to protect occupants during collisions in a lateral direction of the vehicle, as well as when overturning and during rollover accidents; and a side airbag stored in a side support of a seat which is deployed between the occupant and a side panel so as to protect the occupant upon impact in the lateral direction of the vehicle. The present invention relates to a side airbag device.

The side airbag device is stowed in a side supporting part of a seat. Therefore, there are many restrictions on the shape and size, and thus the airbag device packaging must be compact. Therefore, for example, a technique has been proposed in which the airbag is folded or rolled, compressed, and then attached to the seat frame while being held such that the entire body thereof can be covered by a flexible cover. In this case, when the airbag starts to expand by expansion gas, the cover breaks and the airbag expands greatly to the outside.

Furthermore, in addition to the method of holding the airbag in a compressed state by a cover, another method of stowing the airbag in a rigid case has been proposed.

However, when compressed airbags are held in place by a flexible cover or rigid case, as done conventionally, there is a problem in that the time from when the airbag begins to expand to full deployment is extended. It is essential that airbags deploy quickly and reliably.

Furthermore, when airbags are held in place by a cover or rigid case, as done conventionally, these members may interfere with airbag deployment and make the airbag's deployment behavior unstable.

Furthermore, the structure of a conventional device that holds the airbags tends to increase manufacturing costs and complicates the manufacturing process.

SUMMARY OF THE INVENTION

Problem to be Solved by the Invention

In light of the foregoing, an object of the present invention is to provide a side airbag device that contributes to the rapid deployment of an airbag while keeping the airbag compact, using a simple configuration.

Another object of the present invention is to provide a side airbag device capable of promoting an appropriate deployment behavior of the airbag.

Yet another object of the present invention is to provide a side airbag device that contributes to simplifying the manufacturing process and reducing manufacturing cost.

Means to Solve the Problem

In order to achieve the aforementioned object, the present invention is a side airbag device secured to a seat frame of a vehicle seat, and includes: an airbag cushion that restrains an occupant by expanding and deploying, an inflator disposed on an inner side of the seat frame and that supplies expansion gas to the airbag cushion; and a holding part that holds the airbag cushion. The airbag cushion includes an inner expanding portion internally containing the inflator and an outer expanding portion connected to the inner expanding portion and is disposed on an outer side of the seat frame by being folded back at a front edge portion of the seat frame, The outer expanding portion includes a folded portion of the airbag cushion. A forward portion of the holding part contacts an outer surface of the folded portion of the outer expanding portion, and a rearward portion is connected to the seat frame. Furthermore, the holding part is configured to cover a part of the outer expanding portion.

As described above, according to the present invention, one end (front end) of the holding part that holds the folded (compressed) airbag cushion is connected to the folded portion of the airbag cushion, and the other end (rear end) is connected to the seat frame. Since the airbag cushion is fixed to the frame, the shape of the folded (stowed) airbag cushion is retained, and there is no need for a cover member or a case that covers the entire airbag cushion.

The holding part may be formed of resin, and a front side of the seat frame may be opened.

The holding part is made of a holding fabric, and the front portion of the holding fabric is connected to the outer surface of the folded portion of the outer expanding portion, extends in the thickness direction of the folded portion, and is formed of a temporary sewn portion that is broken when the airbag cushion is deployed.

As described above, since the temporarily sewn portion that extends in the thickness direction of the folded portion of the airbag cushion and is sewn to the front end of the holding cloth is formed, the form of the folded (stowed state) airbag cushion is retained by the temporary sewn portion so there is no need for a cover member or case that covers the entire airbag cushion.

In addition, the temporary sewn portion extends in the thickness direction of the folded portion of the airbag cushion. Therefore, immediately after the airbag deployment begins, the outer expanding portion maintains a folded shape and the inner expanding portion on the occupant side deploys first. Thereafter, the temporary sewn portion is broken due to the application of tension, resulting in the outer expanding portion largely deploying.

Furthermore, the folded airbag cushion (outer expanding portion) is essentially held in shape by the temporary sewn portion; therefore, there is no interference between the airbag cushion and the temporary sewn portion (sewing thread) once the temporary sewn portion is broken.

The folded portion can be in a bellow fold or rolled shape.

The temporary sewn portion can be provided so as to pass through the vicinity of a front end of the holding fabric and the vicinity of the center of the folded portion in the thickness direction. This enables the folded portion to be reliably held in shape when the airbag cushion is stowed.

The forward portion of the holding fabric can include a sewn portion that is sewn and secured to the airbag cushion, and a weak portion that can break when the airbag cushion expands and deploys can be provided between the sewn portion and the rearward portion.

Thus, by sewing the forward portion of the holding fabric to the airbag cushion (outer expanding portion), the connection between the holding fabric and the airbag cushion can be made strong, while forming a weak portion on the rearward portion side of the holding fabric ensures that the airbag cushion is released during deployment.

When the airbag cushion in a stowed state is viewed from a vehicle width direction, the temporary sewn portion can extend in a vertical direction on a surface of the outer expanding portion. Such a structure has an advantage in which the folded portion of the airbag cushion is held uniformly in the vertical direction, resulting in the stable deployment behavior of the airbag cushion.

The inflator can have a stud bolt penetrating to the outer side from the inner side of the seat frame, and a rear end of the holding fabric can have a mounting hole that can be engaged with the stud bolt. This eliminates the need for a special structure (mechanism) for securing the rear end of the holding fabric, which makes the structure for retaining the shape of the airbag cushion simpler.

The holding fabric can have a weak portion that can break during deployment of the airbag cushion between the temporary sewn portion and the mounting hole. Thus, by providing a weak portion in the rearward portion of the holding fabric, the weak portion breaks after the temporary sewn portion breaks during deployment of the airbag cushion, thereby enabling the holding fabric to be reliably pulled away from the airbag cushion.

When the airbag cushion in a stowed state is viewed from a vehicle width direction, the temporary sewn portion extends in a vertical direction on a surface of the outer expanding portion, and the weak portion can extend in the vertical direction roughly parallel to the temporary sewn portion.

The weak portion can be a slit or perforation.

The holding fabric can have a slit between the mounting hole and the rear end.

In the specification and claims of the present application, the direction in which the occupant is facing (the direction of vehicle travel) when the occupant is seated in the seat in a normal posture is referred to as "forward" and the opposite direction is referred to as "rear", and the axis of the coordinates are referred to as the "front-rear direction". Moreover, when the passenger is seated in the seat in a regular posture, the right of the passenger is referred to as the "right direction," the left of the passenger is referred to as the "left direction," and the direction indicating the coordinate axis is referred to as the "left and right direction." In the left-right direction, a region on an occupant side from a side frame of the seat shall be referred to as "inside", and a region opposite from the occupant as viewed from the side frame shall be referred to as "outside". Similarly, when the passenger is seated in the seat in a regular posture, the head direction of the passenger is referred to as "up," the waist direction of the passenger is referred to as "down," and the direction indicating the coordinate axis is referred to as the "vertical direction."

The side airbag apparatus according to the present invention includes a type which is deployed on the door side of (outside) the seat, along with a type which is deployed on the vehicle center side of the seat. A side airbag device of a type which is deployed on the vehicle center side of the seat, for example, is referred to as a far side airbag, front center airbag, rear center airbag, and the like.

DESCRIPTION OF THE PREFERRED EMBODIMENTS

A side airbag device according to embodiments of the present invention will be described below with reference to the accompanying drawings.

Figure 1:
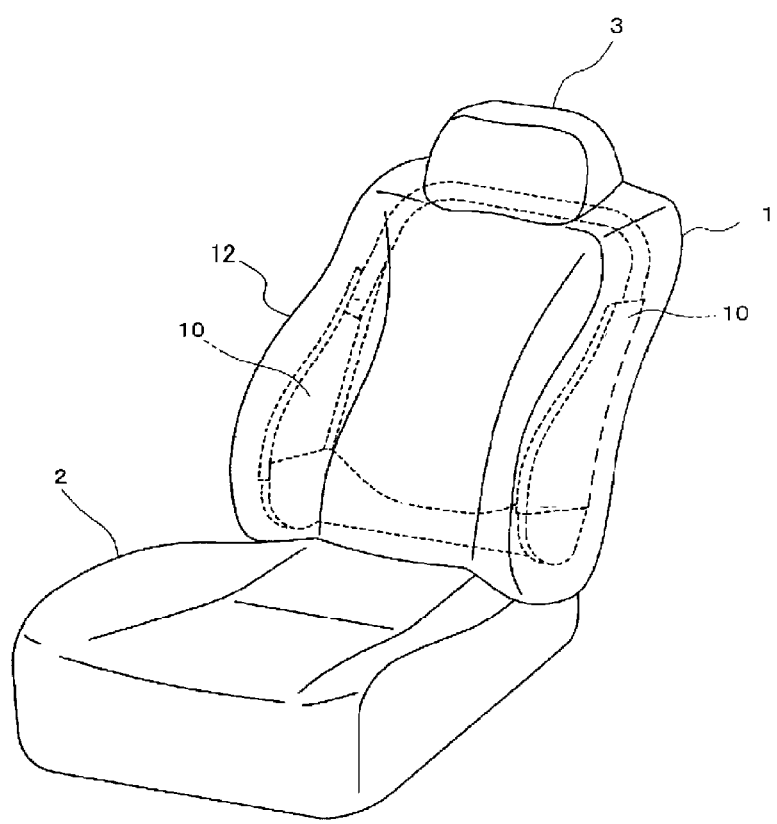
FIG. 1 is a perspective view primarily illustrating an external shape of a vehicle seat according to the present invention, with an illustration of a side airbag device omitted.
Figure 2:
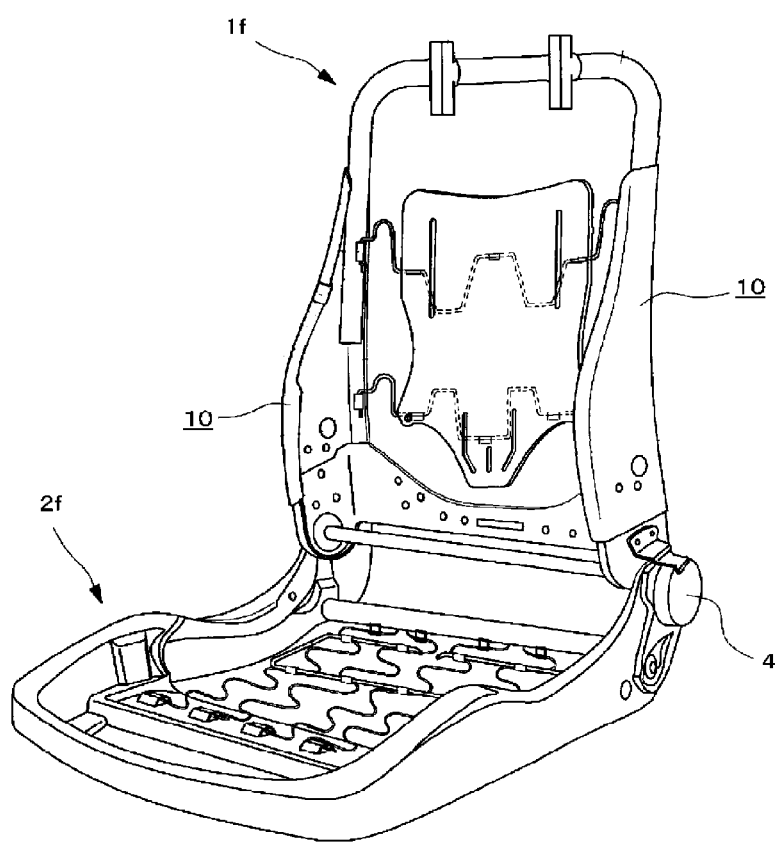
FIG. 2 is a perspective view illustrating an internal structure (seat frame) functioning as a framework of the vehicle seat illustrated in FIG. 1, with an illustration of the side airbag device omitted.
Figure 3:
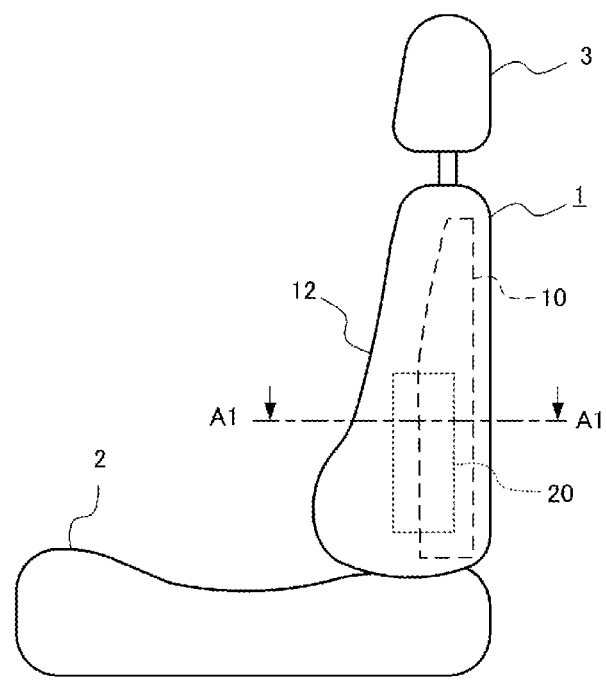
FIG. 3 is a schematic side surface view of the vehicle seat according to the present invention, schematically illustrating a condition where the side airbag device is stored therein, observed from the outside in the vehicle width direction.
Figure 3:
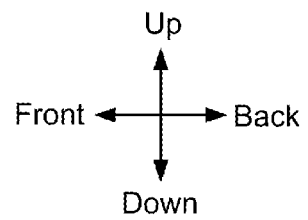
Figure 4:
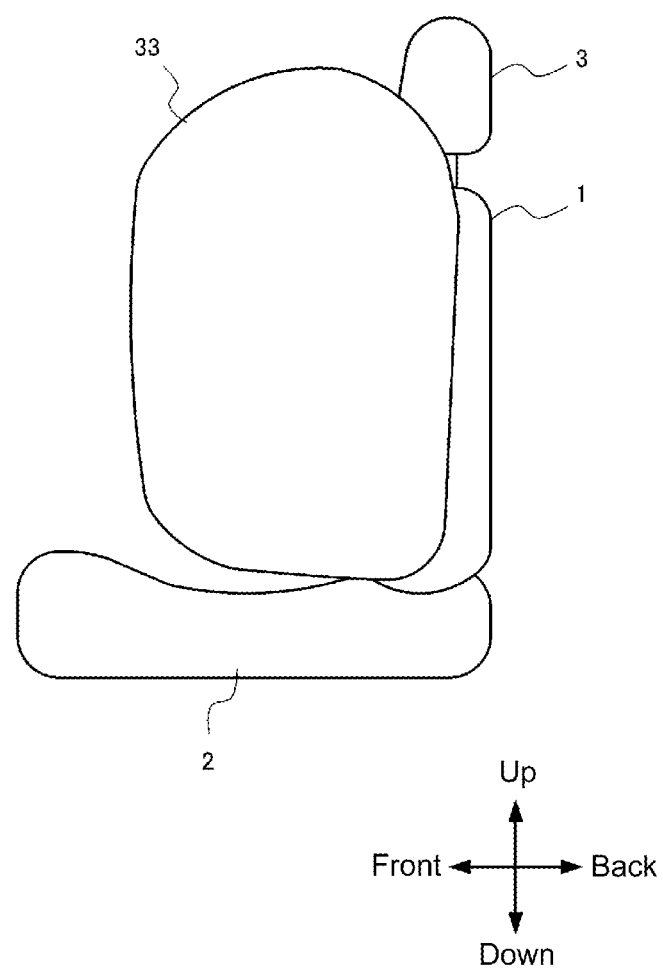
FIG. 4 is a schematic side view of the vehicle seat according to the present invention, illustrating a condition where the airbag cushion is deployed as observed from the outer side in the vehicle width direction.

FIG. 1 is a perspective view primarily illustrating an external shape of a vehicle seat according to the present invention, with an illustration of an airbag device (airbag module) 20 omitted. FIG. 2 is a perspective view illustrating an internal structure (seat frame) functioning as a framework of the vehicle seat illustrated in FIG. 1, with an illustration of the airbag device (airbag module) 20 omitted herein as well. FIG. 3 is a schematic side surface view of the vehicle seat according to the present invention, illustrating a condition where the airbag device (airbag module) 20 is stowed on a side surface (near side) near a left side seat door as observed from the outside in the vehicle width direction. FIG. 4 is a schematic side view of the vehicle seat according to the present invention, illustrating a condition where the airbag cushion is deployed as observed from the outer side in the vehicle width direction.

As illustrated in FIG. 1 and FIG. 2, the vehicle seat in the present embodiment, when viewed as a part, is composed of a seat cushion 2 of a portion in which an occupant is seated, a seat back 1 forming a backrest, and a headrest 3 connected to the upper end of the seat back 1.

As illustrated in FIG. 2, a seat back frame 1f forming a skeleton of the seat is provided inside the seat back 1, a pad 16 (see FIG. 5) made of a urethane foam material or the like is provided on a surface and periphery thereof, and a surface of the pad 16 is covered with a surface skin 14 such as leather, fabric, or the like. A seating frame 2f is provided on a bottom side of the seat cushion 2, and similar to the seat back 1, a pad made of a urethane foam material or the like is provided on an upper surface and periphery thereof, and a surface of the pad is covered by the surface skin 14 (FIG. 5) such as leather, fabric, or the like. The seating frame 2f and the seatback frame 1f are connected via a reclining mechanism 4.

As illustrated in FIG. 2, the seat back frame 1f is configured into a frame shape by side frames 10 disposed laterally spaced apart and extending in the vertical direction, an upper frame connecting the upper ends of the side frames 10, and a lower frame connecting the lower ends thereof. The headrest 3 is configured by providing a cushioned member on an outer side of a headrest frame.

Embodiment 1

Figure 5:
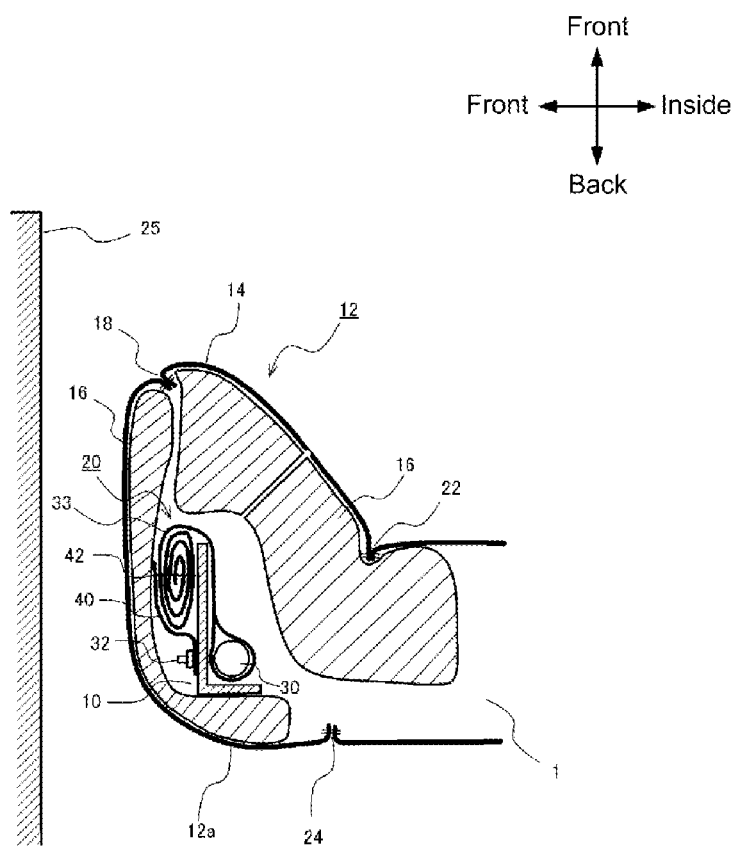
FIG. 5 is a cross sectional view illustrating the structure of the vehicle seat according to Embodiment 1 of the present invention, corresponding to a part of a cross section along the line A1-A1 of FIG. 3.

FIG. 5 is a cross sectional view illustrating the structure of the vehicle seat according to the present invention, corresponding to part of a cross section in an A1-A1 direction of FIG. 3. The side frame 10 can be molded from a resin or a metal and have an L-shaped or U-shaped cross sectional shape, as illustrated in FIG. 5. An airbag module (side airbag device) 20 is secured to the side frame 10.

As illustrated in FIG. 5, the seat back 1 includes a side supporting part 12 which swells in the vehicle traveling direction (vehicle front) on a vehicle width direction side portion (end portion). A urethane pad 16 is arranged inside the side supporting part 12, and the side airbag device 20 is stowed in a gap of the urethane pad 16. The side airbag device 20 includes: an airbag cushion 33 that restrains an occupant when expanded and deployed; and an inflator 30 that supplies expansion gas to the airbag cushion 33. The inflator 30 includes stud bolts 32 penetrating outward from the inner side of the seat frame 10.

Seams 18, 22, 24 of the skin 14 of the seat back 1 are interwoven and connected by sewing. Note that the front seam 18 is configured so as to cleave open when the airbag cushion is deployed. Note that in FIG. 5, reference code 25 indicates a door trim.

Figure 6:
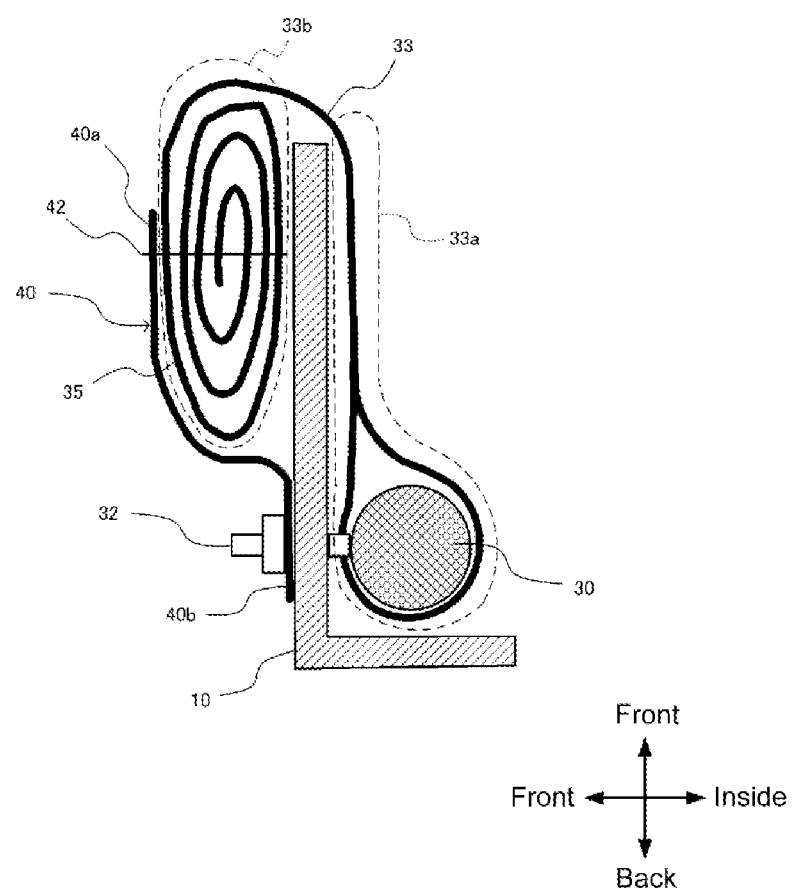
FIG. 6 is an enlarged cross sectional view illustrating a portion of FIG. 5 in an enlarged manner.
Figure 7:
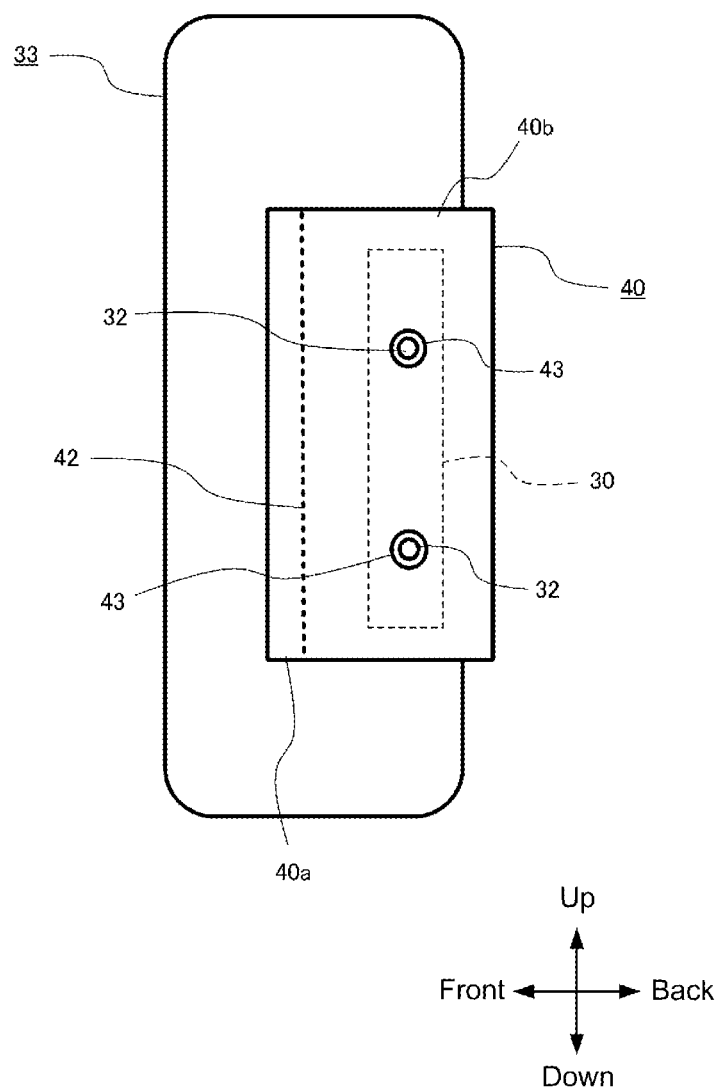
FIG. 7 is a side surface view illustrating a schematic structure of the side airbag device according to Embodiment 1 of the present invention.

FIG. 6 is an enlarged cross sectional view illustrating a portion of FIG. in an enlarged manner, and clearly illustrates the features of the present invention. FIG. 7 is a side surface view illustrating a schematic structure of the side airbag device 20 according to Embodiment 1 of the present invention. The side airbag device 20 according to the present invention has a holding fabric that holds the airbag cushion 33. As illustrated in FIGS. 6 and 7, the holding fabric 40 is molded from a flexible rectangular fabric and is connected to a portion of the airbag cushion 33, but does not cover the entire airbag cushion 33.

As illustrated in FIG. 6, the airbag cushion 33 includes an inner expanding portion 33a internally containing the inflator 33 and an outer expanding portion 33b connected to the inner expanding portion 33a which is disposed on an outer side of the seat frame 10 by being folded back at a front edge portion of the seat frame 10. The outer expanding portion 33b forms a folded portion of the airbag cushion 33. Note that the folded portion (33b) can be in a bellow fold or rolled shape.

As illustrated in FIG. 7, a rear end 40b of the holding fabric 40 has a mounting hole 43 that can be engaged with a stud bolt 32. This eliminates the need for a special structure (mechanism) for securing the holding fabric 40, which makes the structure for retaining the shape of the airbag cushion 33 simpler.

As illustrated in FIG. 6, a front end 40a of the holding fabric 40 is connected by sewing to an outer surface of the folded portion 35 of the outer expanding portion 33b. As described above, the rear end 40b of the holding fabric 40 is secured to the seat frame 10 by engaging the mounting hole 43 with the stud bolt 32 of the inflator 30.

As illustrated in FIGS. 6 and 7, the side airbag device 20 according to the present invention further has a temporary sewn portion 42 formed, which extends in the thickness direction of the folded portion 35, is sewn to connect the front end 40a of the holding fabric 40 with the folded portion 35 (outer expanding portion 33b), and can be broken during deployment of the airbag cushion 33.

As illustrated in FIG. 6, the temporary sewn portion 42 is provided so as to pass through a center vicinity of the folded portion 35 in the thickness direction. This enables the folded portion 35 to be reliably held in shape when the airbag cushion 33 is stowed.

As illustrated in FIG. 7, when the airbag cushion 33 in a stowed state is viewed from the vehicle width direction, the temporary sewn portion 42 extends in the vertical direction on a surface of the outer expanding portion 33b (folded portion 35). With such a structure, the folded portion 35 of the airbag cushion 33 is held uniformly in the vertical direction, resulting in the stable deployment behavior of the airbag cushion 33.

Operation of Embodiment 1

Figure 8A:
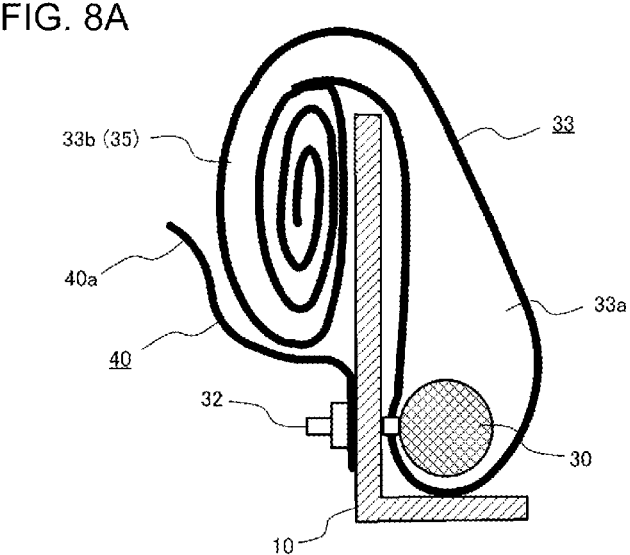
FIG. 8(A), (B) are schematic diagrams (cross sectional) illustrating a deployment operation of the side airbag device according to Embodiment 1 of the present invention.

FIG. 8(A), (B) are schematic diagrams (cross sectional) illustrating a deployment behavior of the side airbag device 20 according to Embodiment 1 of the present invention. When the airbag device 20 is activated in the event of a vehicle collision or the like and expansion gas is discharged from the inflator 30, the inner expanding portion 33a of the airbag cushion 33 begins to expand first, followed by the outer expanding portion 33b.

Figure 8B:
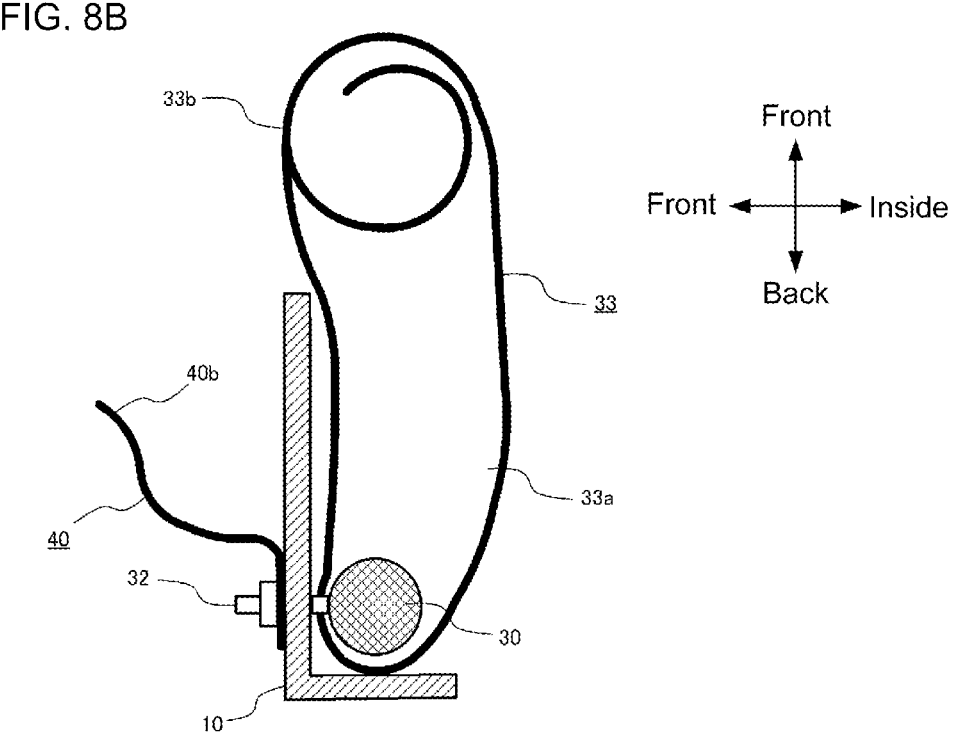

As illustrated in FIG. 8(A), when the outer expanding portion 33b begins to expand and deploy, the temporary sewn portion 42 sewn to the folded portion 35 breaks, and the temporary sewn portion 42 detaches from the airbag cushion 33. Thereafter, as illustrated in FIG. 8(B), the airbag cushion 33 continues to expand and fully deploy in a free state.

According to the present embodiment as described above, the one end of the holding fabric 40 that holds the folded (compressed) airbag cushion 33 is connected to an outer surface of the folded portion 35 of the airbag cushion 33, a rear end is secured to the seat frame 10, and the temporary sewn portion 42 is formed, which extends in the thickness direction of the folded portion 35 and is sewn to the front end of the holding fabric 40. Therefore, the shape of the airbag cushion 33 folded (stowed) by the temporary sewn portion 42 is retained, thereby eliminating the need for a cover member or case that covers the entire airbag cushion 33.

Furthermore, the temporary sewn portion 42 extends in the thickness direction of the folded portion 35 of the airbag cushion 33, and therefore, tension is applied to the temporary sewn portion 42 in the initial stage of deployment of the airbag cushion 33, causing the temporary sewn portion 42 to quickly break.

Furthermore, the folded airbag cushion 33 is essentially held in shape by the temporary sewn portion 42, and therefore, there is also no interference between the airbag cushion 33 and the temporary sewn portion 42 once the temporary sewn portion 42 is broken.

Embodiment 2

Figure 9A:
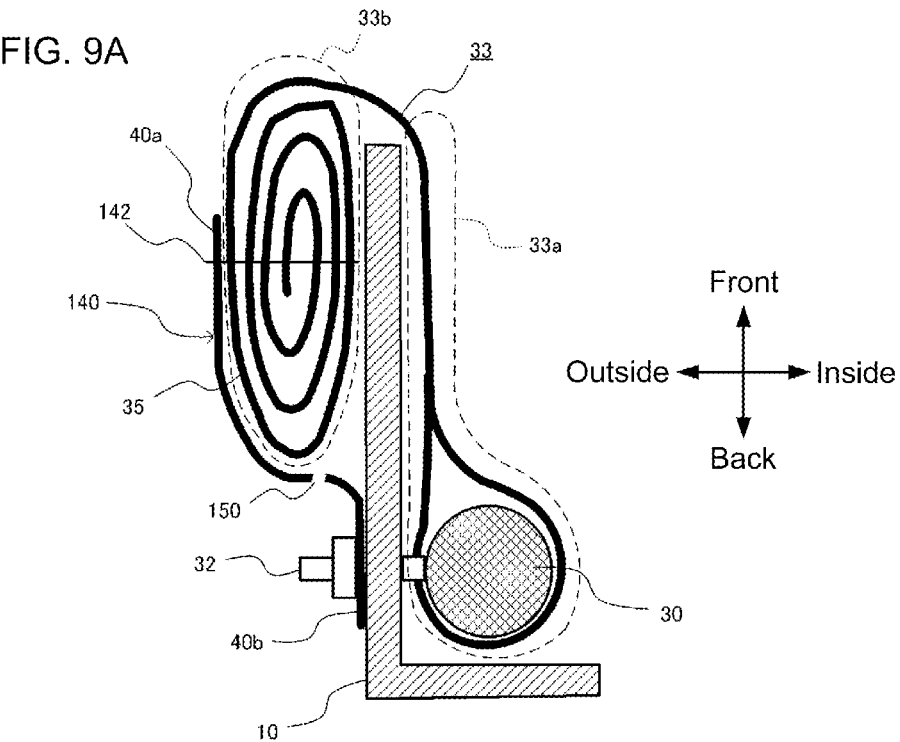
FIG. 9(A), (B) are cross sectional and side surface views illustrating a structure of the main parts of the side airbag device according to Embodiment 2 of the present invention.
Figure 9B:
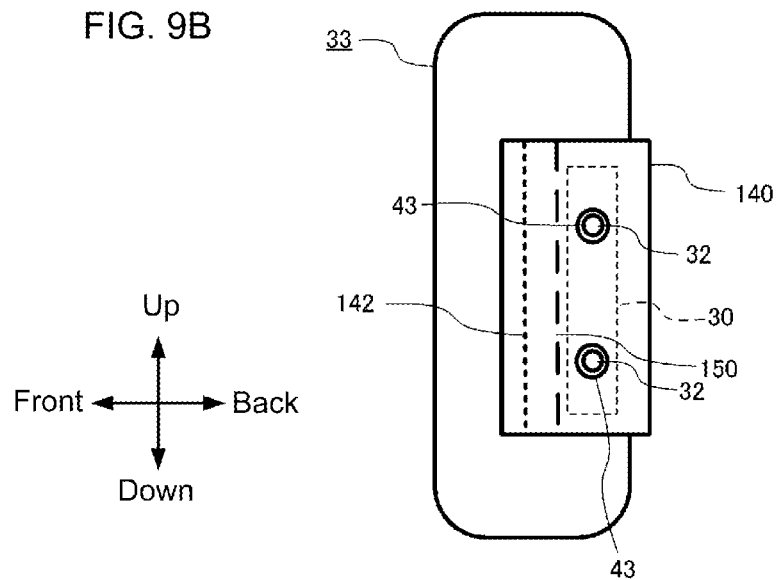

FIG. 9(A), (B) are cross sectional and side surface views illustrating a side airbag device according to Embodiment 2 of the present invention. Note that the same reference codes are used for components that are identical or correspond to those in previously described embodiments, and redundant descriptions are omitted.

In the present embodiment, a weak portion 150 is provided extending in the vertical direction roughly parallel to a temporary sewn portion 142 formed on a holding fabric 140 and extending in the vertical direction. The weak portion 150 can break during deployment of the airbag cushion 33. Note that the weak portion 150 can be a slit or perforation.

As in the present embodiment, by providing the weak portion 150 in the holding fabric 140, it is possible to reliably pull the holding fabric 140 away from the airbag cushion 33 in an initial stage of deployment of the airbag cushion 33.

Embodiment 3

Figure 10A:
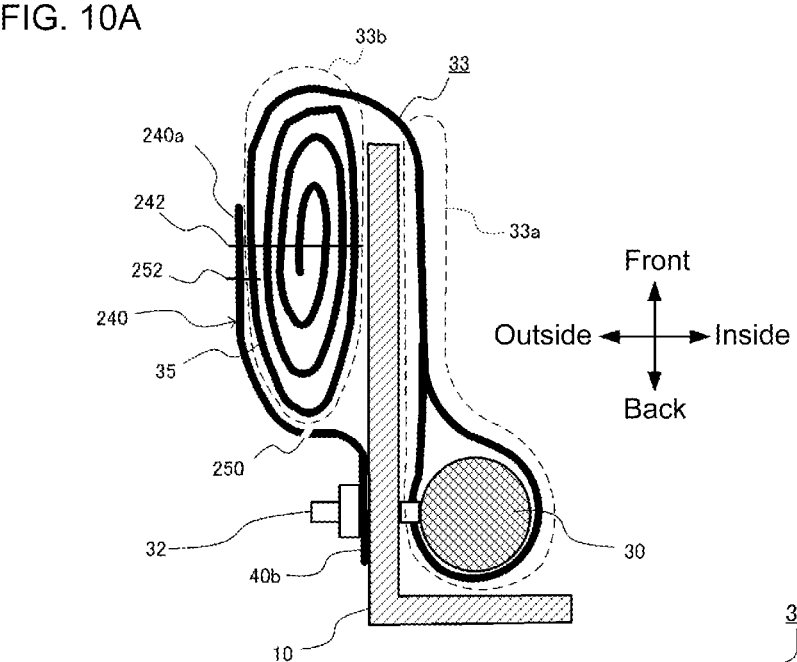
FIG. 10(A), (B) are cross sectional and side surface views illustrating a structure of the main parts of the side airbag device according to Embodiment 3 of the present invention.
Figure 10B:
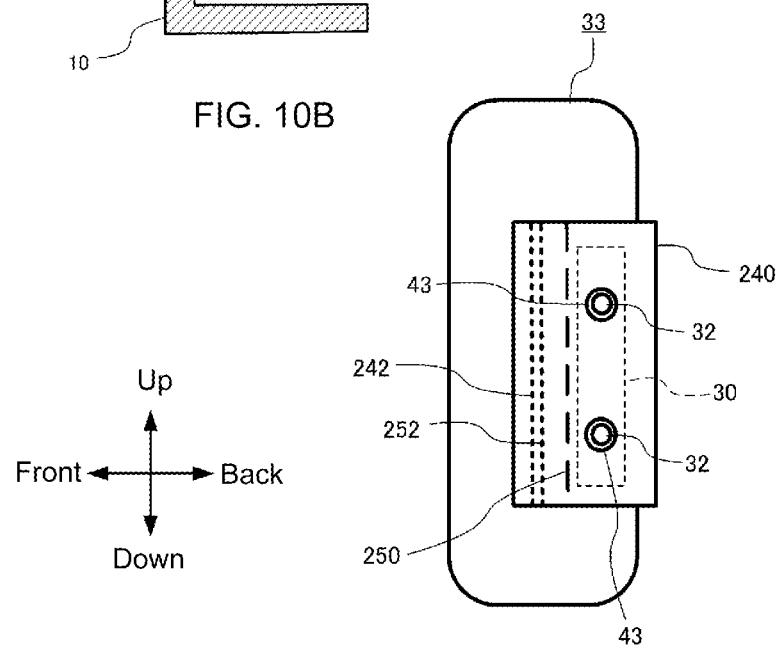

FIG. 10(A), (B) are cross sectional and side surface views illustrating a side airbag device according to Embodiment 3 of the present invention. Note that the same reference codes are used for components that are identical or correspond to those in previously described embodiments, and redundant descriptions are omitted.

In the present embodiment, a weak portion 250 is provided extending in the vertical direction roughly parallel to a temporary sewn portion 242 formed on a holding fabric 240 and extending in the vertical direction. The temporary sewn portion 242 and the weak portion 250 can break during deployment of the airbag cushion 33. Note that the weak portion 250 can be a slit or perforation, similar to Embodiment 2.

A difference between the present embodiment and Embodiment 2 described above is that in addition to the temporary sewn portion 242, a normal sewn portion 252 is provided. The sewn portion 252 is configured to connect a forward portion of the holding fabric 240 to an outermost circumferential portion of the outer expanding portion 33b of the folded airbag cushion 33. The temporary sewn portion 242 and the sewn portion 252 are fastened at two points, and therefore, a function of retaining the shape when attaching the folded airbag cushion 33 to the seat frame is further improved.

Embodiment 4

Figure 11A:
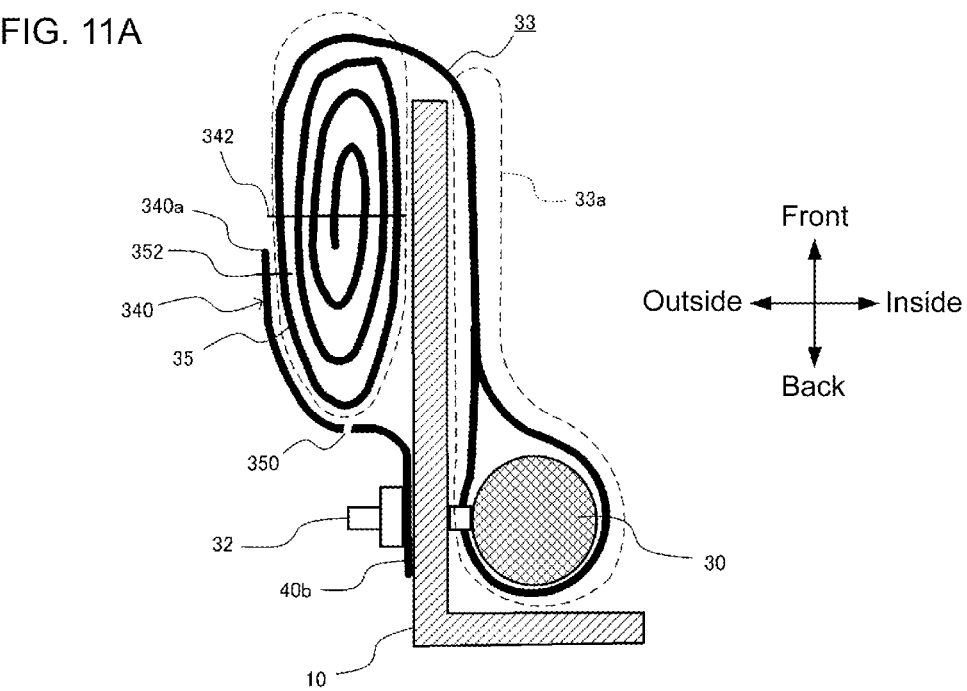
FIG. 11(A), (B) are cross sectional and side surface views illustrating a structure of the main parts of the side airbag device according to Embodiment 4 of the present invention.
Figure 11B:
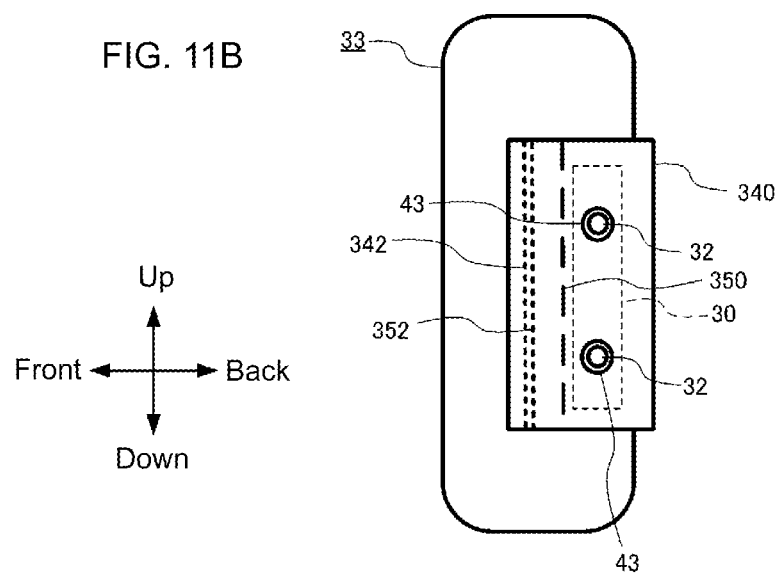

FIG. 11(A), (B) are cross sectional and side surface views illustrating a side airbag device according to Embodiment 4 of the present invention. Note that the same reference codes are used for components that are identical or correspond to those in previously described embodiments, and redundant descriptions are omitted.

In the present embodiment, a weak portion 350 is provided extending in the vertical direction roughly parallel to a temporary sewn portion 342 formed on a holding fabric 340 and extending in the vertical direction. The temporary sewn portion 342 and the weak portion 350 can break during deployment of the airbag cushion 33. Note that the weak portion 350 can be a slit or perforation, similar to Embodiments 2 and 3. The sewn portion 352 connects a forward portion of the holding fabric 340 to an outermost circumferential portion of the outer expanding portion 33b of the folded airbag cushion 33.

A difference between the present embodiment and Embodiment 3 described above is that the temporary sewn portion 342 is connected to the outer expanding portion 33b of the airbag cushion 33, but is not connected to the holding fabric 340. Similar to Embodiment 3, the temporary sewn portion 342 and the sewn portion 352 are fastened at two points, and therefore, a function of retaining the shape when attaching the folded airbag cushion 33 to the seat frame is further improved.

Figure 12:
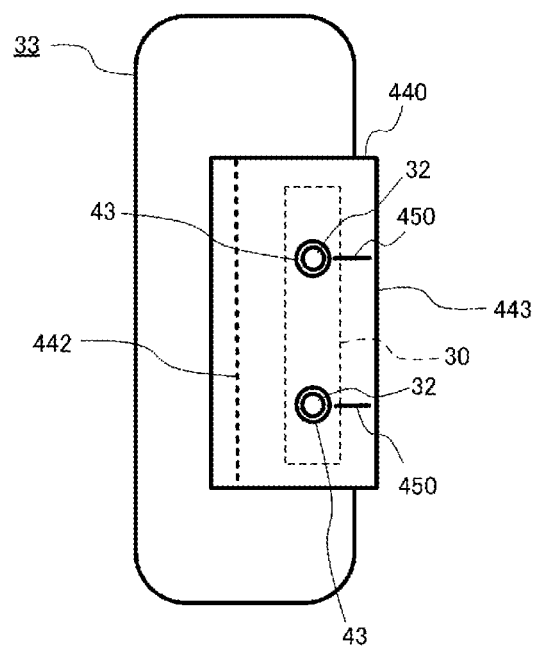
FIG. 12 is a side surface view illustrating a modified example of the present invention.
Figure 12:
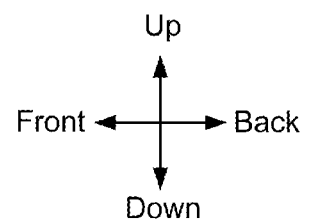

FIG. 12 illustrates the configuration of another weak portion that can be applied to the holding fabric of the present invention. In this example, two slits 450 are formed between a rear edge portion 443 of the holding fabric 440 and the mounting holes 43, extending in the front-rear direction as weak portions that can be broken when the airbag cushion 33 is deployed.

Embodiment 5

Figure 13:
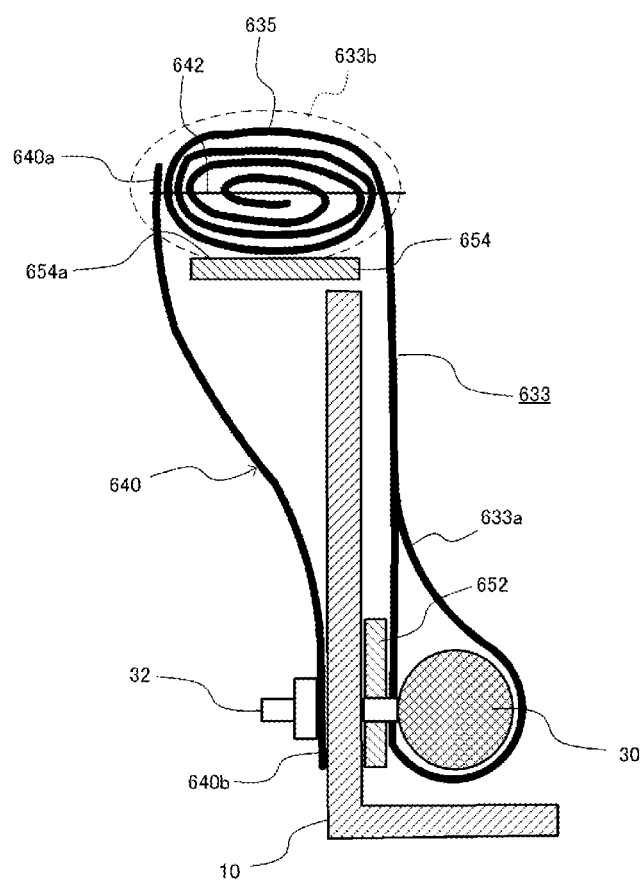
FIG. 13 is a cross sectional view illustrating the main parts of the side airbag device according to Embodiment 5 of the present invention, and corresponds to FIG. 6 illustrating the side airbag device according to Embodiment 1.
Figure 13:
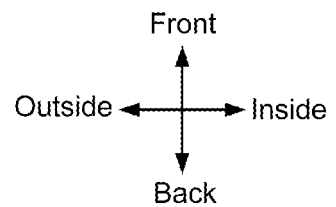

FIG. 13 is a cross sectional view illustrating the main parts of the side airbag device according to Embodiment 5 of the present invention, and corresponds to FIG. 6 illustrating the side airbag device according to Embodiment 1. In the present embodiment, brackets 652 and 654 for mounting an airbag device are employed, and a compressed airbag cushion 633 is secured to the side frame via the brackets 652 and 654.

The brackets (652 and 654) are provided with a first plate 654, which is a flat plate extending in the vertical direction, and a second plate 652 through which two of the stud bolts 32 connected to the inflator 30 passes through and are directly secured to the side frame 10. These brackets 652, 654 are disposed such that the first plate 654 and second plate 652 are roughly orthogonal when viewed in a cross section perpendicular to a longitudinal direction, and are connected to each other by welding or the like.

The first plate 654 of the bracket has a first surface 654a facing in the vehicle traveling direction, and a folded portion 635 of an outer expanding portion 633b of an airbag cushion 633 is disposed along the first surface 654a. Furthermore, when compressed airbag cushion 633 expands and deploys in the vehicle traveling direction, the first surface 654a of the first plate 654 is a reaction force surface, and thus the airbag cushion 633 reliably and quickly deploys forward.

On the other hand, the second plate 652 of the bracket is disposed such that a portion of an inner expanding portion 633a of the airbag cushion 633 is in contact.

In Embodiment 1 described above, the folded portion 35 of the airbag cushion 33 is disposed along a surface on the outer side of the seat frame 10, but in the present embodiment, the folded portion 635 is disposed in contact with the first plate 654 of the bracket. Furthermore, a front end 640a of the holding fabric 640 and the folded portion 635 are connected by a temporary sewn portion 642.

Note that the weak portions employed in Embodiment 2 to Embodiment 4 described above can also be applied in the present embodiment and the modified example described below.

Figure 14:
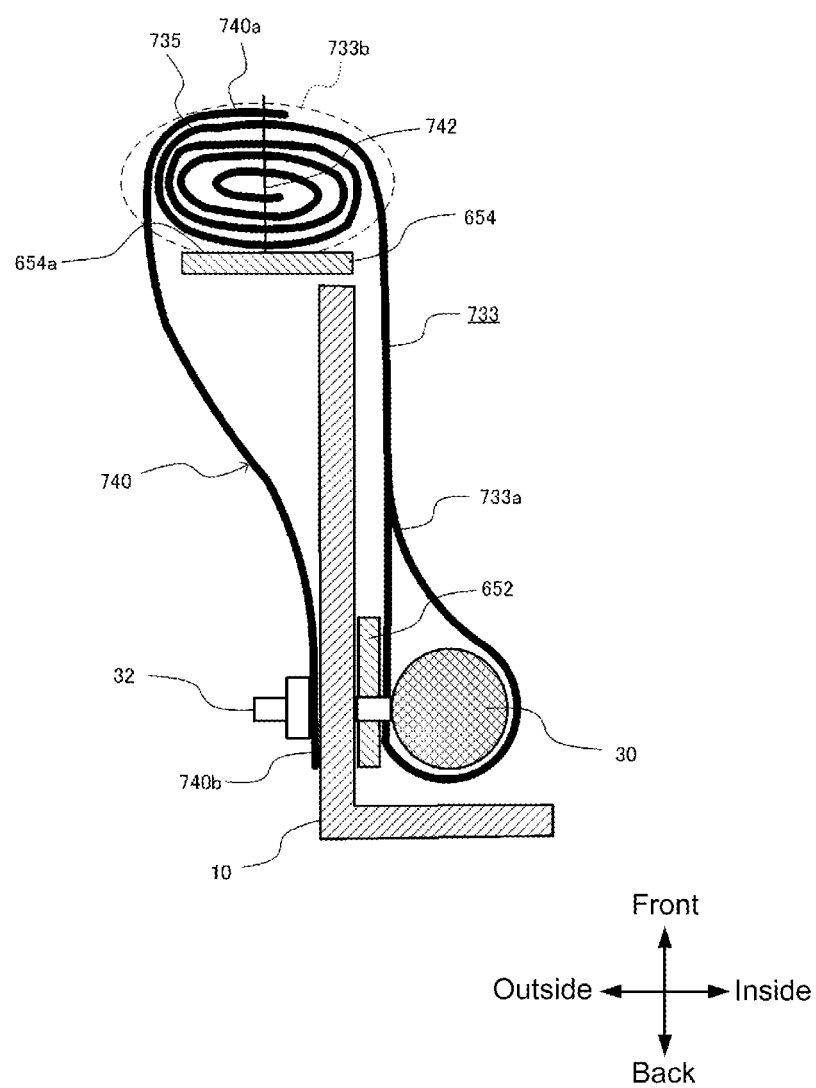
FIG. 14 is a modified example of Embodiment 5 illustrated in FIG. 13.

FIG. 14 is a modified example of Embodiment 5 illustrated in FIG. 13, in which the direction in which a temporary sewn portion 742 extends is different, and other configurations are the same. In the modified example, an airbag cushion 733 is also secured to the side frame 10 via the brackets 652, 654.

A front end 740a of a holding fabric 740 reaches the front of a folded portion 735 of the airbag cushion 733, and the front end 740a and folded portion 735 are connected by the temporary sewn portion 742. Herein, the temporary sewn portion 742 is provided to pass through the folded portion 735 in the front-rear direction.

Embodiment 6

Figure 15:
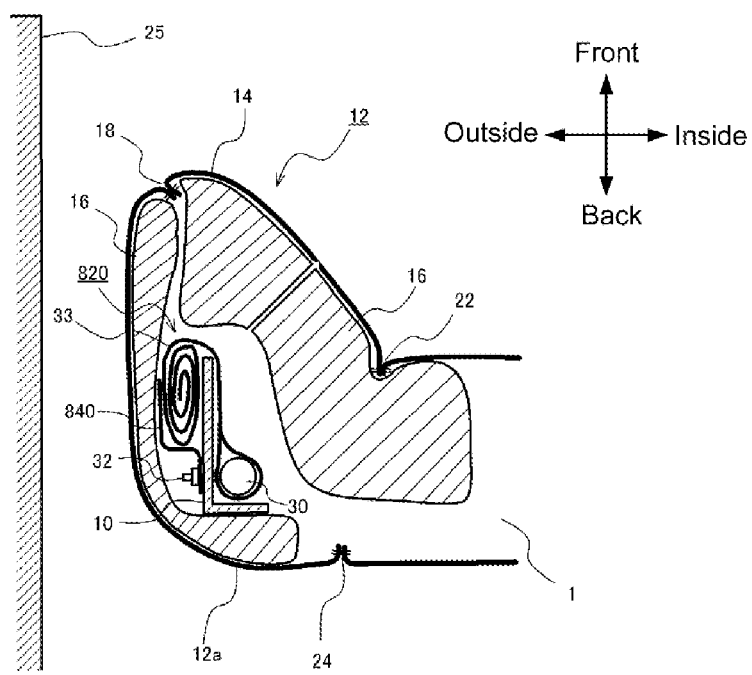
FIG. 15 is a cross sectional view illustrating the structure of the vehicle seat according to Embodiment 6 of the present invention, corresponding to a part of a cross section along the line A1-A1 of FIG. 3.
Figure 16:
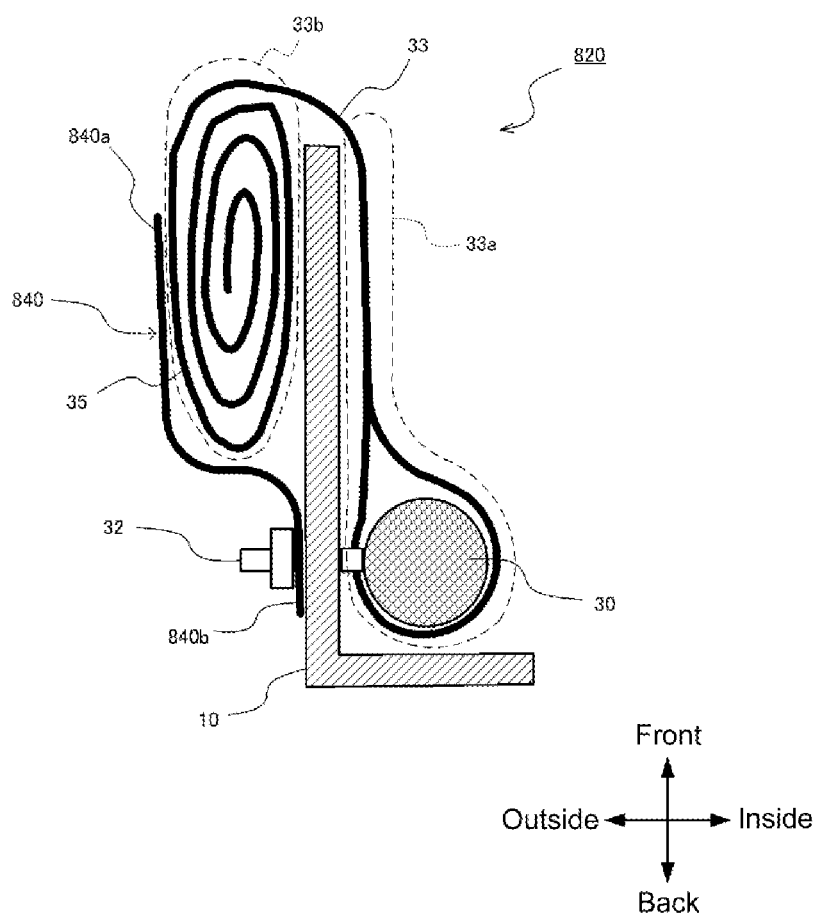
FIG. 16 is an enlarged cross sectional view illustrating a portion of FIG. 15 in an enlarged manner.
Figure 17:
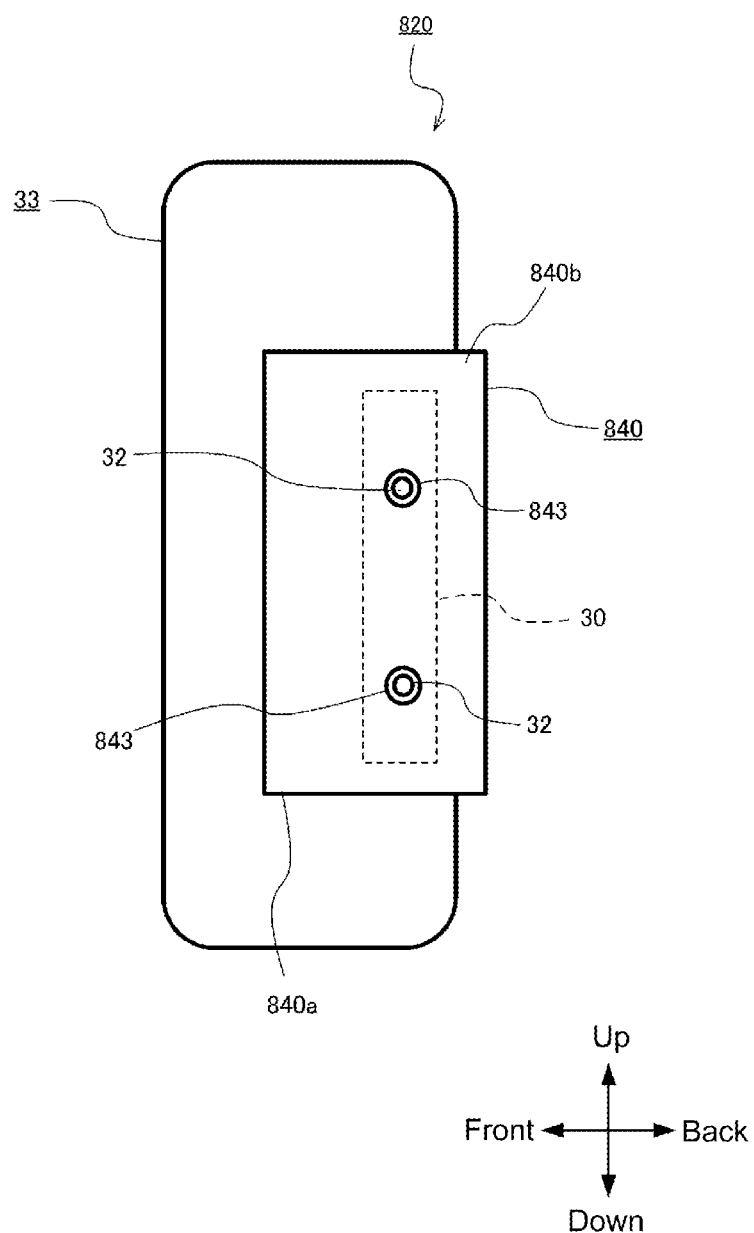
FIG. 17 is a side surface view illustrating a schematic structure of the side airbag device according to Embodiment 6 of the present invention.

FIG. 15 is a cross sectional view illustrating the structure of the vehicle seat according to Embodiment 6 of the present invention, corresponding to a part of a cross section along the line A1-A1 of FIG. 3. FIG. 16 is an enlarged cross sectional view illustrating a portion of FIG. 15 in an enlarged manner, and clearly illustrates the features of the present embodiment. FIG. 17 is a side surface view illustrating a schematic structure of the side airbag device 820 according to the present embodiment. In the present example, structural elements identical or corresponding to those of Examples 1 to 5 are labeled with identical symbols, with redundant descriptions thereof omitted.

The side airbag device 820 according to the present invention has a holding member 840 made of resin that holds the airbag cushion 33. As illustrated in FIG. 16 and FIG. 17, the holding member 840 is generally rectangularly shaped when viewed from the side and is configured to cover a portion of the airbag cushion 33, similar to other embodiments.

As illustrated in FIG. 17, a rear end 840b of the holding member 840 has a mounting hole 843 that can be engaged with a stud bolt 32. This eliminates the need for a special structure (mechanism) for securing the holding member 840, which makes the structure for retaining the shape of the airbag cushion 33 simpler.

Also, as illustrated in FIG. 16, the front end 840a of the holding member 840 contacts along the outer surface of the folded portion 35 of the outer expanding portion 33b. As described above, the holding member 840 is secured to the seat frame 10 by engaging the mounting hole 843 in the rear end 840b of the holding member 840 with the stud bolt 32 of the inflator 30.

In the present embodiment, when the airbag device 820 is activated when a vehicle collision or the like occurs and expansion gas is discharged from the inflator 30, the inner expanding portion 33a of the airbag cushion 33 begins to expand first, followed by the outer expanding portion 33b.

When the outer expanding portion 33b starts to be inflated and deployed, the holding member 840 that is in contact with the folded portion 35 is deformed or broken, the front end 840a is widened, and the airbag cushion 33 is fully deployed forward.

As described above, according to the present embodiment, since the holding member 840 made of resin is utilized, the airbag cushion 33 can be reliably retained by the rigidity of the holding member 840 itself. As a result, there is no need for temporary stitching or providing a weak portion as in a holding member made of cloth; therefore, simplification of the structure and simplification of the manufacturing process are anticipated.

Although the present invention has been described with reference to embodiments, the present invention is not limited in any way to these embodiments, and can be changed as appropriate within the scope of the technical idea of the present invention. For example, while a side airbag on the near side has been predominantly mentioned in the embodiments described above, use is also possible with a far side airbag (surface on the far side from a vehicle door of a vehicle seat), in ultra compact vehicles such as a single seat vehicle (irrespective of the presence of a door, a vehicle including parts with only one seat in a single row), and the like.

The invention claimed is:

1. A side airbag device secured to a seat frame of a vehicle seat, comprising:
   an airbag cushion that restrains an occupant by expanding and deploying;
   an inflator disposed on an inner side of the seat frame and that supplies expansion gas to the airbag cushion; and
   a holding part that holds the airbag cushion,
   wherein the airbag cushion includes an inner expanding portion internally containing the inflator and an outer expanding portion connected to the inner expanding portion which is disposed to an outer side of the seat frame by being folded back at a front edge portion of the seat frame,
   wherein the outer expanding portion includes a folded portion of the airbag cushion,
   wherein a forward portion of the holding part contacts an outer surface of the folded portion of the outer expanding portion, and a rearward portion is connected to the seat frame,
   wherein the holding part covers a portion of the outer expanding portion, and
   wherein the holding part is configured by a holding fabric, the forward portion of the holding fabric is connected to an outer surface of the folded portion of the outer expanding portion, and a temporary sewn portion is formed extending in thickness direction of the folded portion and broken when the airbag cushion is deployed.

2. The side airbag device according to claim 1, wherein the holding part is formed of resin, and a forward side of the seat frame is open.

3. The side airbag device according to claim 1, wherein the temporary sewn portion is provided so as to pass through proximate a front end of the holding fabric and proximate a center of the folded portion in the thickness direction.

4. The side airbag device according to claim 1, wherein the forward portion of the holding fabric includes a sewn portion that is sewn and secured to the airbag cushion, and a weak portion that can break when the airbag cushion expands and deploys is provided between the sewn portion and the rearward portion.

5. The side airbag device according to claim 1, wherein when the airbag cushion in a stowed state is viewed from a vehicle width direction, the temporary sewn portion extends in a vertical direction on a surface of the outer expanding portion.

6. The side airbag device according to claim 1, wherein the inflator has a stud bolt penetrating to the outer side from the inner side of the seat frame, and a rear end of the holding fabric has a mounting hole that can be engaged with the stud bolt.

7. The side airbag device according to claim 6, wherein the holding fabric has a weak portion that can break during deployment of the airbag cushion between the temporary sewn portion and the mounting hole.

8. The side airbag device according to claim 7, wherein when the airbag cushion in a stowed state is viewed from a vehicle width direction, the temporary sewn portion extends in a vertical direction on a surface of the outer expanding portion, and the weak portion extends in the vertical direction roughly parallel to the temporary sewn portion.

9. The side airbag device according to claim 7, wherein the weak portion includes a slit or perforation.

10. The side airbag device according to claim 6, wherein the holding fabric has a slit between the mounting hole and the rear end.

11. The side airbag device according to claim 1, wherein the folded portion is formed in a bellows fold or rolled shape.

* * * * *